US008217376B2

(12) United States Patent
Liu et al.

(10) Patent No.: US 8,217,376 B2
(45) Date of Patent: Jul. 10, 2012

(54) METHOD OF CALIBRATING A WAVELENGTH-MODULATION SPECTROSCOPY APPARATUS USING A FIRST, SECOND, AND THIRD GAS TO DETERMINE TEMPERATURE VALUES TO CALCULATE CONCENTRATIONS OF AN ANALYTE IN A GAS

(75) Inventors: Xiaoyong Liu, Malden, MA (US);
Yufeng Huang, North Chelmsford, MA (US); John McKinley Poole, Maynard, MA (US); Gene Smith Berkowitz, Sudbury, MA (US); Anthony Kowal, Berlin, MA (US); Shawn D. Wehe, Niskayuna, NY (US); Hejie Li, Schenectady, NY (US)

(73) Assignee: GE Infrastructure Sensing, Inc., Billerica, MA (US)

( * ) Notice: Subject to any disclaimer, the term of this patent is extended or adjusted under 35 U.S.C. 154(b) by 0 days.

(21) Appl. No.: 13/083,697

(22) Filed: Apr. 11, 2011

(65) Prior Publication Data

US 2011/0181876 A1     Jul. 28, 2011

Related U.S. Application Data

(62) Division of application No. 12/249,049, filed on Oct. 10, 2008, now Pat. No. 7,943,915.

(51) Int. Cl.
*G01V 8/00* (2006.01)
*G01J 3/28* (2006.01)

(52) U.S. Cl. .................... 250/559.1; 356/326

(58) Field of Classification Search ............ 250/226, 250/339.13, 339.1, 340, 345, 343, 301, 341.5, 250/208.2, 575, 573, 574, 559.1, 222.2, 559.4, 250/221; 356/300–303, 306–309, 319–334, 356/451–456, 436–440; 73/31.03, 24.02
See application file for complete search history.

(56) References Cited

U.S. PATENT DOCUMENTS

| 4,979,823 | A | * | 12/1990 | Mohr et al. ................. 356/307 |
| 5,813,767 | A | * | 9/1998 | Calabro' et al. ............ 374/142 |
| 5,838,008 | A | * | 11/1998 | Esler et al. ............. 250/339.08 |
| 6,044,329 | A | * | 3/2000 | Kidd ............................ 702/28 |
| 7,122,152 | B2 | * | 10/2006 | Lewis et al. ................... 422/50 |
| 7,704,301 | B2 | * | 4/2010 | Zhou et al. ..................... 95/90 |
| 2007/0229834 | A1 | * | 10/2007 | Patel et al. ................... 356/432 |

* cited by examiner

*Primary Examiner* — Que T Le
*Assistant Examiner* — Jennifer Bennett
(74) *Attorney, Agent, or Firm* — GE Global Patent Operation; Mark A. Conklin

(57) ABSTRACT

Several methods of calibrating a wavelength-modulation spectroscopy apparatus configured to measure a concentration of an analyte in a sample gas are disclosed. Each of the methods allows for calibration and recalibration using a relatively safe gas regardless of whether the sample gas for which the concentration of the analyte can be determined is a hazardous gas. In one embodiment of the invention, calibration that is sample-gas specific is accomplished by determining a first slope coefficient and calibration function for the sample gas, after which a scaling factor can be determined based on the first slope coefficient and a second slope coefficient for the same or a different sample gas and used in a subsequent calibration (or recalibration) to scale the calibration function. In other embodiments of the invention, calibration that is not sample-gas specific is accomplished to allow for the determination of the analyte concentration in variable gas compositions and constant gas compositions.

6 Claims, 4 Drawing Sheets

FIG. 4

| | -20°C | -10°C | 0°C | 10°C | 20°C | 30°C | 40°C | 50°C | 60°C |
|---|---|---|---|---|---|---|---|---|---|
| 10 psi | 0.000229 | 0.000239 | 0.000250 | 0.000261 | 0.000273 | 0.000285 | 0.000297 | 0.000310 | 0.000323 |
| 11 psi | 0.000240 | 0.000250 | 0.000261 | 0.000271 | 0.000283 | 0.000294 | 0.000306 | 0.000318 | 0.000331 |
| 12 psi | 0.000254 | 0.000264 | 0.000274 | 0.000284 | 0.000295 | 0.000306 | 0.000318 | 0.000330 | 0.000342 |
| 13 psi | 0.000269 | 0.000279 | 0.000288 | 0.000299 | 0.000309 | 0.000320 | 0.000331 | 0.000343 | 0.000355 |
| 14 psi | 0.000286 | 0.000295 | 0.000305 | 0.000315 | 0.000325 | 0.000336 | 0.000347 | 0.000358 | 0.000370 |
| 15 psi | 0.000305 | 0.000314 | 0.000323 | 0.000333 | 0.000343 | 0.000353 | 0.000364 | 0.000375 | 0.000387 |
| 16 psi | 0.000325 | 0.000334 | 0.000343 | 0.000352 | 0.000362 | 0.000373 | 0.000383 | 0.000394 | 0.000406 |
| 17 psi | 0.000346 | 0.000355 | 0.000364 | 0.000373 | 0.000383 | 0.000393 | 0.000404 | 0.000415 | 0.000426 |
| 18 psi | 0.000369 | 0.000378 | 0.000387 | 0.000396 | 0.000406 | 0.000416 | 0.000426 | 0.000437 | 0.000448 |
| 19 psi | 0.000394 | 0.000402 | 0.000411 | 0.000420 | 0.000430 | 0.000440 | 0.000450 | 0.000460 | 0.000471 |
| 20 psi | 0.000420 | 0.000428 | 0.000437 | 0.000446 | 0.000455 | 0.000465 | 0.000475 | 0.000485 | 0.000496 |
| 21 psi | 0.000447 | 0.000455 | 0.000464 | 0.000473 | 0.000482 | 0.000492 | 0.000502 | 0.000512 | 0.000523 |
| 22 psi | 0.000476 | 0.000484 | 0.000492 | 0.000501 | 0.000510 | 0.000520 | 0.000530 | 0.000540 | 0.000551 |
| 23 psi | 0.000506 | 0.000514 | 0.000522 | 0.000531 | 0.000540 | 0.000549 | 0.000559 | 0.000569 | 0.000580 |
| 24 psi | 0.000538 | 0.000545 | 0.000554 | 0.000562 | 0.000571 | 0.000580 | 0.000590 | 0.000600 | 0.000611 |
| 25 psi | 0.000571 | 0.000578 | 0.000586 | 0.000595 | 0.000604 | 0.000613 | 0.000622 | 0.000632 | 0.000643 |

METHOD OF CALIBRATING A WAVELENGTH-MODULATION SPECTROSCOPY APPARATUS USING A FIRST, SECOND, AND THIRD GAS TO DETERMINE TEMPERATURE VALUES TO CALCULATE CONCENTRATIONS OF AN ANALYTE IN A GAS

CROSS REFERENCE TO RELATED APPLICATION

This application is a divisional of U.S. Ser. No. 12/249,096 filed on Oct. 10, 2008 now U.S. Pat. No. 7,943,915, the entire disclosure of which is incorporated herein by reference.

BACKGROUND OF THE INVENTION

The invention relates generally to spectroscopy methods and apparatuses, and more particularly to a method of calibrating a wavelength-modulation spectroscopy apparatus.

The majority of wavelength-modulation spectroscopy gas analyzers employ a technique called 2f, where laser wavelength is modulated at 1f but the resulting signal demodulated at the second harmonic, designated as 2f, to produce the second harmonic spectrum of the analyte. The magnitude of the harmonic spectrum (e.g., the peak height) is then used to determine the analyte concentration in the sample gas, such as, but not limited to, the concentration of moisture (water vapor) in natural gas. This determination of analyte concentration is made based on a defined relationship between the analyte concentration and the magnitude of the harmonic spectrum, and often relies on the peak height of second harmonic spectrum. However, the 2f peak height is affected not only by analyte concentration, but also by the pressure, temperature, and composition of the sample gas. As a result, calibration of these analyzers is sample gas-specific (i.e., an analyzer calibrated to measure the concentration of an analyte in sample gas A (e.g., natural gas) cannot accurately measure the concentration of the same analyte in sample gas B (e.g., nitrogen or air)). Furthermore, an analyzer designed to determine the concentration of an analyte in a particular sample gas that is hazardous (e.g., toxic, flammable, explosive, etc.) can only be calibrated during manufacturing and re-calibrated using the same hazardous gas. Therefore, a need exists for a method of calibrating a wavelength-modulation spectroscopy apparatus that would allow for calibration with a relatively safe gas while providing the ability to measure analyte concentration in various sample gases.

BRIEF DESCRIPTION OF THE INVENTION

Several methods of calibrating a wavelength-modulation spectroscopy apparatus configured to measure a concentration of an analyte in a sample gas are disclosed. Each of the methods allows for calibration and recalibration using a relatively safe gas regardless of whether the sample gas for which the concentration of the analyte can be determined is a hazardous gas. In one embodiment of the invention, calibration that is sample-gas specific is accomplished by determining a first slope coefficient and calibration function for the sample gas, after which a scaling factor can be determined based on the first slope coefficient and a second slope coefficient for the same or a different sample gas and used in a subsequent calibration (or recalibration) to scale the calibration function. In other embodiments of the invention, calibration that is not sample-gas specific is accomplished to allow for the determination of the analyte concentration in variable gas compositions and constant gas compositions.

BRIEF DESCRIPTION OF THE DRAWINGS

FIG. 4 illustrates an example abridged calibration matrix for 2f wavelength-modulation spectroscopy of moisture in air computed in one embodiment of the invention.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
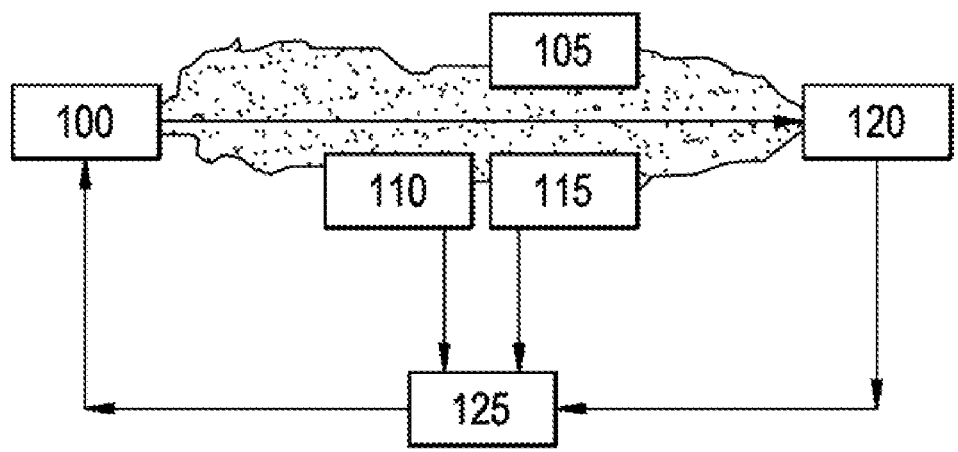
FIG. 1 illustrates a high-level component diagram of an exemplary wavelength-modulation spectroscopy apparatus.

In one embodiment of the invention, there is provided a method of calibrating a wavelength modulation spectroscopy apparatus. A high-level component diagram of an exemplary wavelength-modulation spectroscopy apparatus to be calibrated is illustrated in FIG. 1. A skilled artisan would appreciate the fact that the calibration methods of the invention are not limited to a particular spectroscopy apparatus, and can be practiced with wide range of wavelength modulation spectroscopy apparatuses.

A wavelength-modulation spectroscopy apparatus can include a monochromatic radiation 100 passing through a sample gas 105, a detector 120 that detects the intensity of the radiation 100 transmitted through the sample gas 105, a pressure sensor 110 and a temperature sensor 115 monitoring the sample gas pressure and temperature, respectively, and electronic circuitry 125 which can be employed to wavelength-modulate the radiation 100 at a modulation frequency, pre-amplify, acquire and demodulate by phase-sensitive detection the signal from the detector 120, at a harmonic of the modulation frequency, to produce a harmonic spectrum; and determine analyte concentration based on the measured spectrum, pressure and temperature of the sample gas 105. A skilled artisan would appreciate the fact that the configuration of a wavelength-modulation spectroscopy apparatus can vary from the configuration described herein, depending on technical requirements and design.

Generally, a wavelength-modulation spectroscopy apparatus, which can be configured to measure an analyte concentration in a sample gas, requires calibration. Assuming that a wavelength-modulation spectroscopy apparatus detects the $n^{th}$ harmonic spectrum of the analyte, the relation of the analyte concentration X, expressed as the mole fraction of the analyte in the sample, to the $n^{th}$ harmonic spectral signal magnitude $H_n(\bar{v}, a)$ can be generally described by the following equation:

$$X = \frac{\pi}{P \cdot L \cdot S(T) \cdot \int_{-\pi}^{\pi} \Phi(\bar{v}(t) + a\cos(\omega t))\cos(n\omega t)d(\omega t)} \cdot H_n(\bar{v}, a) + b \quad (1)$$

The relation of the analyte concentration X to the amplitude of the $n^{th}$ harmonic spectrum, $H_{n,m}(v_0, a)$, which is defined as the maximum of the harmonic spectral signal magnitude, can be described by the following equation:

$$X = \frac{\pi}{P \cdot L \cdot S(T) \cdot \int_{-\pi}^{\pi} \Phi(v_0 + a\cos(\omega t))\cos(n\omega t)d(\omega t)} \cdot H_{n,m}(v_0, a) + b \quad (2)$$

$$= C(P, T, \gamma) \cdot H_{n,m}(v_0, a) + b$$

wherein the calibration slope function $C(P, T, \gamma)$ can be defined $$C(P, T, \gamma) = \frac{\pi}{P \cdot L \cdot S(T) \cdot \int_{-\pi}^{\pi} \Phi(v_0 + a\cos(\omega t))\cos(n\omega t)d(\omega t)} \quad (3)$$

P is the total pressure of the sample gas:
L is the absorption path length;
S(T) is the spectral line intensity;
$\Phi(v)$ is the spectral line profile function;
$\overline{v}(t)$ is the center frequency of a monochromatic radiation;
$v_0$ is the spectral line transition frequency [cm$^{-1}$];
a is the wavelength modulation amplitude;
$\omega$ is the angular frequency relating to the modulation frequency (f) as $\omega=2\pi f$; and
b is an intercept coefficient that corresponds to the contribution from noise floor of harmonic spectrum. Due to the noise floor, even if the analyte concentration X equals zero, the spectral amplitude $H_{n,m}(v_0, a)$ can not normally reach zero, thus requiring a non-zero intercept coefficient b.

The spectral line intensity $S(T)$ [cm$^{-2}$/psi] is temperature-dependent and can be defined by the following equation:

$$S(T) = S(T_{ref}) \frac{Q(T_{ref})}{Q(T)} \frac{\exp(-c_2 E_\eta/T)}{\exp(-c_2 E_\eta/T_{ref})} \frac{1-\exp(-c_2 v_0/T)}{1-\exp(-c_2 v_0/T_{ref})} \frac{T_{ref}}{T} \quad (4)$$

wherein
Q(T) is the total internal partition sum;
$c_2 = 1.4387752$ cm K is the second radiation constant; and
$E_\eta$ is the lower state energy [cm$^{-1}$].

Employing the Voigt line profile function for describing the spectral line profile, $$\Phi(v) = \Phi_V(v) = \frac{2}{\Delta v_D} \sqrt{\frac{\ln 2}{\pi}} \frac{r}{\pi} \int_{-\infty}^{+\infty} \frac{e^{-y^2}}{r^2 + (w-y)^2} dy \quad (5)$$

wherein the auxiliary variables r, w, and y are defined as follows:

$$r = \frac{\sqrt{\ln 2}\, \Delta v_C}{\Delta v_D} \quad (6)$$

$$w = \frac{2\sqrt{\ln 2}\,(v - v_0)}{\Delta v_D} \quad (7)$$

$$y = \frac{2\sqrt{\ln 2}\, v}{\Delta v_D} \quad (8)$$

The Doppler linewidth (FWHM) can be defined as follows:

$$\Delta v_D = 7.1623 \times 10^{-7} v_0 \sqrt{\frac{T}{M}} \quad (9)$$

The pressure-broadened linewidth (FWHM) can be defined as follows:

$$\Delta v_c = \gamma \cdot P \quad (10)$$

The effective pressure-broadening coefficient (FWHM) $\dot{\gamma}$, which can be both gas-specific and temperature-dependent, can be defined as follows:

$$\gamma = \sum_j X_j \gamma_j \quad (11)$$

$$\gamma(T) = \gamma(T_{ref})(T_{ref}/T)^\varepsilon. \quad (12)$$

In equation (11), $X_j$ and $\gamma_j$ are the mole fraction of the $j^{th}$ component of the sample and the pressure-broadening coefficient (FWHM) due to perturbation by the $j^{th}$ component, respectively.

Equations (5)-(10), describing the spectral line profile $\phi(v)$, indicate that a variation in sample gas pressure ($P_1$), temperature (T), and composition can lead to a change in spectral line profile $\phi(v)$.

Figure 2:
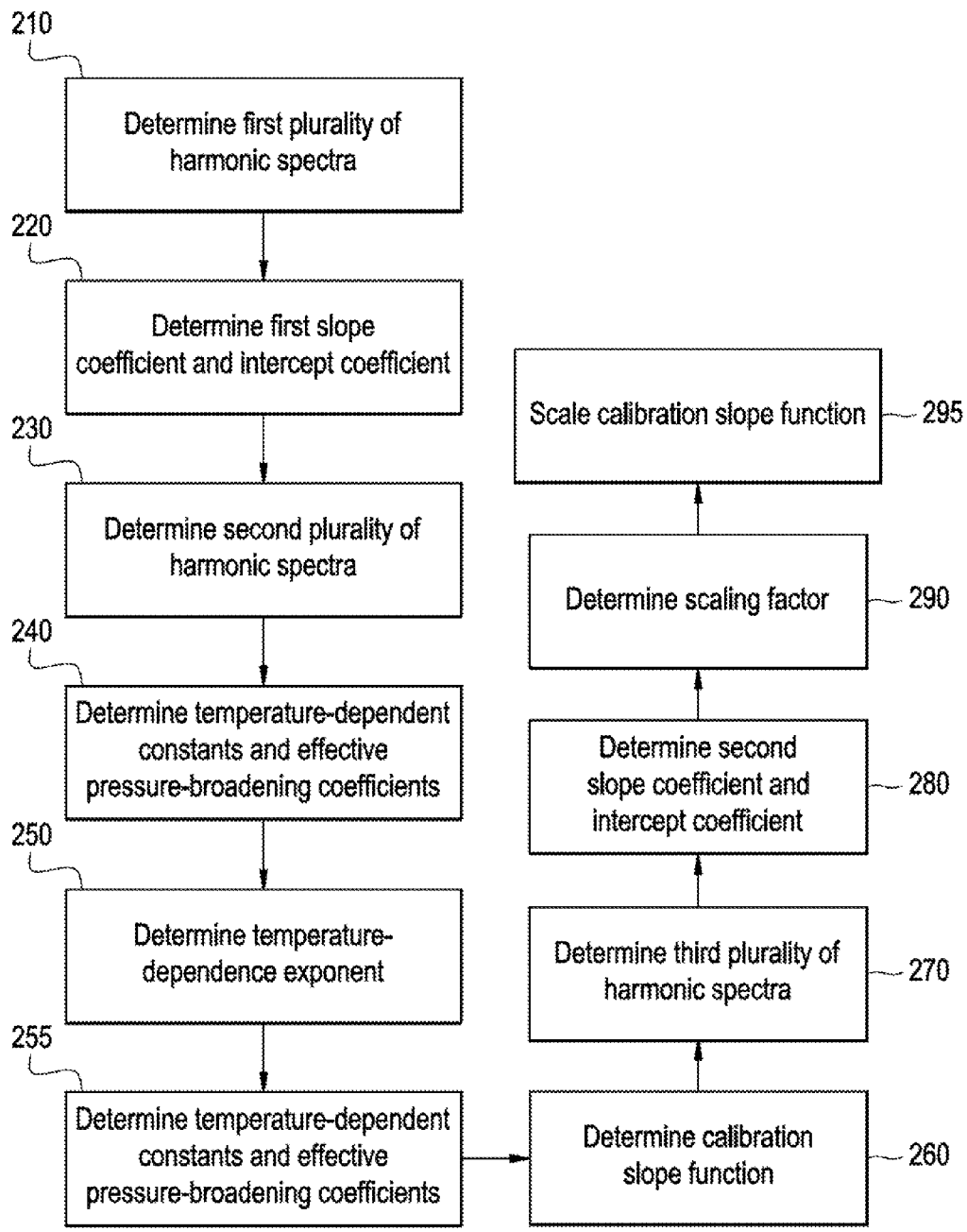
FIG. 2 illustrates a flowchart of one embodiment of the method of calibrating a wavelength-modulation spectroscopy apparatus.

In one embodiment of the invention described with reference to flowchart illustrated in FIG. 2, to calibrate a wavelength-modulation spectroscopy apparatus, a plurality of values of the calibration slope function defined by the equation (3) can be determined, for each sample gas, and for a plurality of sample gas pressure values and a plurality of sample gas temperature values. These calibration slope function values can be conveniently represented in a matrix form for each sample gas. The calibration process can be performed at the development stage, manufacturing stage or during the lifetime of a spectroscopy apparatus.

At step 210, a first plurality of harmonic spectra (H) of known analyte concentrations (X) in a sample gas can be determined at a reference pressure $P_{ref}$ and a reference temperature $T_{ref}$. The sample gas can be a relatively safe gas or hazardous gas.

At step 220, a slope coefficient $C(P_{ref}, T_{ref}, \gamma)$ for the sample gas corresponding to the reference pressure $P_{ref}$ and reference temperature $T_{ref}$, and the intercept coefficient b can be determined based on the first plurality of harmonic spectra (H) of known analyte concentrations (X) determined at step 210, e.g., by a linear fit of the data to equation (2). A skilled artisan would appreciate the fact that other methods of determining the slope coefficient and the intercept coefficient value based on the determined spectra are within the scope and the spirit of the invention. At this stage, the effective pressure-broadening coefficient ($\gamma$) can be left undetermined.

At step 230, a second plurality of harmonic spectra (H) of one or more known analyte concentrations (X) in the sample gas can be determined at various gas temperatures (T).

At step 240, a plurality of values of a temperature-dependent constant $$\frac{\pi}{L \cdot S(T)},$$

and a plurality of values of an effective pressure-broadening coefficient $\gamma$ of the sample gas, corresponding to the various gas temperatures (T) can be determined based on the second plurality of harmonic spectra (H) determined in step 230 and the intercept coefficient b determined in step 210, using the following procedure.

Doppler linewidth $\Delta v_D$ at the various temperatures can be calculated according to the equation (9). The spectral line profile function $\phi(v)$ can be assumed to be defined by the Voigt line profile defined by the equation (5). The values of $$\frac{\pi}{L \cdot S(T)}$$

and γ can be varied to fit each measured spectrum to equation (1) until the difference between simulated and actual results is minimized thus yielding the true values of $$\frac{\pi}{L \cdot S(T)}$$

and γ. In one embodiment, a standard non-linear least square fitting routine can be used for this purpose. The fitting procedure can be repeated to determine $$\frac{\pi}{L \cdot S(T)}$$

and γ values at the various temperatures. A skilled artisan would appreciate the fact that other methods of determining these values based on the measured spectra are within the scope and the spirit of the invention.

As is evident from its formula, the temperature-dependent constant $$\frac{\pi}{L \cdot S(T)}$$

has at least one temperature-dependent variable (e.g., S(T), while other variables or constants are not necessarily temperature-dependent (e.g., π is not temperature-dependent, and L is not necessarily temperature-dependent).

At step 250, the temperature-dependence exponent ε for calculating the pressure-broadening coefficient for a given temperature is determined, by fitting γ and T values to equation (12).

At step 255, the temperature-dependent constant $$\frac{\pi}{L \cdot S(T)}$$

and the effective pressure-broadening coefficient γ are determined for various temperatures within a specified range at a specified step size, according to equations (4) and (12), respectively.

At step 260 the calibration slope function C(P, T, γ) for the sample gas at a plurality of gas temperature values and pressure values can be determined according to equation (3). The calibration slope function values can be conveniently stored in a matrix form. FIG. 4 illustrates an abridged calibration matrix for 2f wavelength-modulation spectroscopy of moisture in air.

Steps 210-260 can be performed for each of the sample gases that might be involved in the manufacture and use of a wavelength-modulation spectroscopy apparatus. They constitute the engineering calibration, which can be performed at the development stage of the spectroscopy apparatus. At the manufacturing stage or during the apparatus lifetime, a spectroscopy apparatus can be recalibrated to account for variations of the spectroscopy apparatus being recalibrated from the apparatus used for the engineering calibration. The recalibration procedure can be performed using a relatively safe sample gas.

At step 270, a plurality of harmonic spectra (H) of known analyte concentrations (X) in a sample gas of choice (e.g., a relatively safe gas) can be determined at a reference pressure $P_{ref}$ and a reference temperature $T_{ref}$.

At step 280, a slope coefficient $C(P_{ref}, T_{ref}, \gamma)$ for the sample gas corresponding to the reference pressure $P_{ref}$ and reference temperature $T_{ref}$, and the intercept coefficient b can be determined based on the plurality of harmonic spectra (H) of known analyte concentrations (X) measured at step 270, e.g., by a linear fit of the data to equation (2). A skilled artisan would appreciate the fact that other methods of determining the slope coefficient and the intercept coefficient value based on the determined spectra are within the scope and the spirit of the invention.

At step 290, a scaling factor can be determined as the ratio of the slope coefficient value determined at step 280 and the slope coefficient value determined during the engineering calibration at step 220 for the same sample gas.

At step 295, each of the calibration slope function values determined during the engineering calibration at step 260 can be multiplied by the scaling factor determined at step 290 to produce an adjusted calibration matrix comprising a plurality of adjusted calibration function values. This adjusted calibration matrix and the intercept coefficient b determined at step 280 enable the determination of, analyte concentration in a sample gas based on the measurement of a harmonic spectrum, according to equation (2).

A wavelength-modulation spectroscopy apparatus calibrated in this manner is versatile and able to accurately measure analyte concentration in different background gases within a specified range of sample gas pressure and temperature. In addition, it allows the use of a relatively safe gas for manufacture calibration, verification of calibration, and recalibration, thus facilitating the regulatory compliance. Since both the calibration matrix and intercept coefficient are pre-determined, it does not require substantial microprocessor capabilities for digital signal processing and analyte concentration determination. Therefore, the calibration method according to the invention provides a viable, cost-effective solution to the calibration challenge associated with a wavelength-modulation spectroscopy apparatus.

In another embodiment of the invention, described with reference to FIG. 3, the values of the temperature-dependent constant $$\frac{\pi}{L \cdot S(T)}$$

and the intercept coefficient b are pre-determined with a sample gas of choice (e.g., a relatively safe gas) during the calibration process. Assuming sufficient microprocessor capabilities, the analyte concentration X and the effective pressure-broadening coefficient γ can be determined simultaneously in real time by a spectroscopy apparatus, using the pre-determined values of the temperature-dependent constant $$\frac{\pi}{L \cdot S(T)}$$

and the intercept coefficient b determined during the calibration process. An advantage of this method is that the values of the temperature-dependent constant $$\frac{\pi}{L \cdot S(T)}$$

and the intercept coefficient b pre-determined during the calibration process using a relatively safe sample gas can be used in computing the analyte concentrations in any "real life" sample gas, thus requiring no prior knowledge of the sample gas composition. The calibration method can comprise the steps 310-350 as illustrated by the flowchart of FIG. 3.

At step 310, a first plurality of harmonic spectra (H) of known analyte concentrations (X) can be determined for a relatively safe sample gas at a reference pressure $P_{ref}$ and a reference temperature $T_{ref}$.

At step 320, a slope coefficient $C(P_{ref}, T_{ref}, \gamma)$ for the sample gas corresponding to the reference pressure $P_{ref}$ and reference temperature $T_{ref}$ and the intercept coefficient b can be determined based on the first plurality of harmonic spectra (H) of known analyte concentrations (X) determined at step 310, e.g., by a linear fit of the data to equation (2). A skilled artisan would appreciate the fact that other methods of determining the slope coefficient and the intercept coefficient value based on the determined spectra are within the scope and the spirit of the invention. At this stage, the effective pressure-broadening coefficient (γ) can be left undetermined.

At step 330, the temperature-dependent constant $$\frac{\pi}{L \cdot S(T)},$$

and the effective pressure-broadening coefficient γ of the sample gas, corresponding to a known temperature can be determined based on at least one harmonic spectrum (H) at the known temperature and a known pressure of the sample gas and the intercept coefficient b determined in step 320, following the procedure described with respect to step 240. In one embodiment, the sample gas in step 310 can differ from the sample gas in step 330. In the event that the sample gas in step 310 is the same as the sample gas in step 330, the harmonic spectrum used in step 330 can be selected from the plurality of harmonic spectra determined in step 310 and the known temperature can be the reference temperature $T_{ref}$.

At step 340, at least one harmonic spectrum of unknown concentration of analyte in a "real life" sample gas as well as the pressure and temperature of the "real life" sample gas are measured.

At step 350, these values can be fitted by a spectroscopy apparatus to equation (1) in real time to determine the analyte concentration X in and the effective pressure-broadening coefficient γ of the "real life" sample gas, based on the pre-determined values of $$\frac{\pi}{L \cdot S(T)}$$

and b, and based on the harmonic spectrum, pressure, and temperature of the "real life" sample gas that are measured.

The steps 310-330 can be performed at the development and manufacturing stage of a spectroscopy apparatus. The steps 340-350 can be performed during the lifetime of the spectroscopy apparatus.

This embodiment involves only minimal engineering or manufacturing stage calibration yet enables accurate real-time determination of analyte concentration in a sample gas of unknown composition. The engineering or manufacturing stage calibration can use a sample gas of choice, which can be a relatively safe gas, and the calibration is not sample gas-specific. A wavelength-modulation spectroscopy apparatus produced according to this embodiment is able to respond effectively to any change in sample gas pressure, temperature and composition to ensure accurate determination of analyte concentration. This is especially valuable for process gas analysis where the gas composition is often variable.

Figure 3:
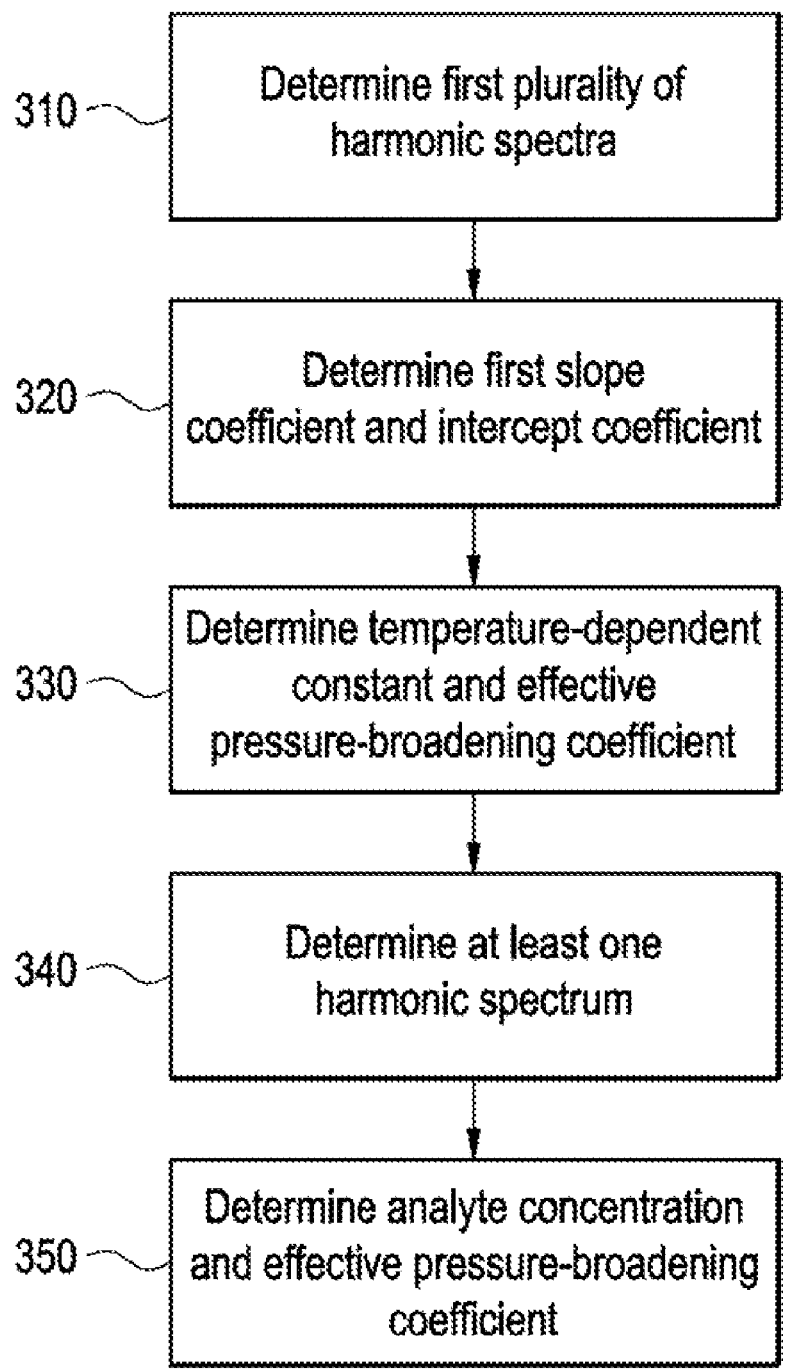
FIG. 3 illustrates a flowchart of another embodiment of the method of calibrating a wavelength-modulation spectroscopy apparatus.

In another embodiment, the calibration method illustrated in FIG. 3 can be employed for applications where the composition of a sample gas is constant. In those applications, an intermediate microprocessor can be used to determine the effective pressure-broadening coefficient γ of the sample gas only once when a spectroscopy apparatus is employed to measure the sample gas for the first time. The analyte concentration X in the sample gas can be determined in real time by the spectroscopy apparatus using the once determined effective pressure-broadening coefficient γ, and the pre-determined values of the temperature-dependent constant $$\frac{\pi}{L \cdot S(T)}$$

and the intercept coefficient b determined during the calibration process. This embodiment employs the same steps 310-350 discussed above, but only determines the effective pressure-broadening coefficient γ of the "real life" sample gas once and determines the analyte concentration based, in part, on this effective pressure-broadening coefficient γ.

In operation, when a spectroscopy apparatus is employed to measure a certain gas for the first time, at least one harmonic spectrum, the pressure and the temperature of the sample gas are measured and can be fitted to equation (1) to determine the analyte concentration X and the effective pressure-broadening coefficient γ, based on the predetermined during the calibration process values of $$\frac{\pi}{L \cdot S(T)}$$

and b determined in steps 310-330. In the subsequent measurements of the same sample gas, the analyte concentration can be determined in step 350 in real time according to equation (2), based on at least one measured harmonic spectrum, the once determined effective pressure-broadening coefficient γ, and the pre-determined during the calibration process values of $$\frac{\pi}{L \cdot S(T)}$$

and b.

This embodiment involves only minimal engineering or manufacturing stage calibration with a sample gas of choice, which can be a relatively safe gas, while enabling accurate real-time determination of the analyte concentration in a sample gas of unknown yet constant composition.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. A skilled artisan would appreciate the fact that any variants of the calibration method and the embodiments still fall within the scope and the spirit of the invention.

What is claimed is:

1. A method of calibrating a wavelength-modulation spectroscopy apparatus configured to measure a concentration of an analyte in a sample gas, said method comprising the steps of:
    determining an intercept coefficient reflecting contribution from the noise floor, said determination based on a plurality of harmonic spectra of known concentrations of said analyte at a reference pressure and a reference temperature of a first sample gas;
    determining a temperature-dependent constant reflecting spectral line intensity corresponding to a known temperature of a second sample gas, said determination based on said intercept coefficient and at least one harmonic spectrum of known concentration of said analyte at a known pressure and said known temperature of said second sample gas; and
    determining the concentration of said analyte in a third sample gas, said determination based on said intercept coefficient, said temperature-dependent constant, a pressure of said third sample gas, a temperature of said third sample gas, and at least one harmonic spectrum of said analyte in said third sample gas.

2. The method of claim 1, wherein said steps of determining said intercept coefficient and said temperature-dependent constant are performed during or before a manufacturing stage of said apparatus.

3. The method of claim 1, wherein said first sample gas and said second sample gas are relatively safe.

4. The method of claim 1, wherein said first sample gas and said second sample gas are the same.

5. The method of claim 1, wherein said first sample gas, said second sample gas, and said third sample gas are the same.

6. The method of claim 1, wherein said step of determining said concentration of said analyte in said third sample gas is performed in real time.

* * * * *